(12) United States Patent
Sankey et al.

(10) Patent No.: US 8,197,925 B2
(45) Date of Patent: Jun. 12, 2012

(54) SELF-VENTING POLYMERIC FILM

(75) Inventors: Stephen William Sankey, Great Smeaton (GB); Ken Evans, Yarm (GB); David Voisin, Midlothian, VA (US); Stephen Keith Franzyshen, Richmond, VA (US)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 734 days.

(21) Appl. No.: 10/564,594

(22) PCT Filed: Jul. 16, 2004

(86) PCT No.: PCT/GB2004/003098
§ 371 (c)(1),
(2), (4) Date: May 15, 2006

(87) PCT Pub. No.: WO2005/007400
PCT Pub. Date: Jan. 27, 2005

(65) Prior Publication Data
US 2006/0269767 A1 Nov. 30, 2006

(30) Foreign Application Priority Data
Jul. 16, 2003 (GB) .................................. 0316708.7

(51) Int. Cl.
*B32B 3/24* (2006.01)
*B65D 81/34* (2006.01)
*B65D 33/01* (2006.01)

(52) U.S. Cl. ........ 428/138; 426/113; 426/108; 426/122; 383/103

(58) Field of Classification Search .................. 428/138; 426/113, 118, 122; 383/103
See application file for complete search history.

(56) References Cited

U.S. PATENT DOCUMENTS

| | | | |
|---|---|---|---|
| 4,172,824 A | 10/1979 | Harrington et al. | |
| 4,333,968 A | 6/1982 | Nahmias | |
| 4,450,250 A | 5/1984 | McConnell et al. | |
| 4,515,841 A * | 5/1985 | Dyke | 428/35.4 |
| 4,581,087 A | 4/1986 | Johnson | |
| 4,640,838 A * | 2/1987 | Isakson et al. | 426/107 |
| 4,725,481 A | 2/1988 | Ostapchenko | |
| 4,918,156 A | 4/1990 | Rogers | |
| 5,114,766 A | 5/1992 | Jacques | |
| 5,832,699 A | 11/1998 | Zobel | |

(Continued)

FOREIGN PATENT DOCUMENTS

DE 19710079 9/1998

(Continued)

OTHER PUBLICATIONS

Nakamura & Partners; Letter regarding Japanese Office Action; Apr. 6, 2010, 1 p.; Tokyo, Japan.

(Continued)

*Primary Examiner* — William P Watkins, III
(74) *Attorney, Agent, or Firm* — RatnerPrestia

(57) ABSTRACT

A heat-scalable, composite film said film comprising a polymeric substrate layer having a first and second surface and disposed on a surface of the substrate layer a water-soluble barrier layer, wherein (i) the substrate layer has one or more venting means therein; and (ii) the thickness of the barrier layer is from about 0.05 to about 40 μm; a process for the manufacture thereof; and use thereof as a self-venting film in the packaging of an ovenable meal.

31 Claims, 1 Drawing Sheet

U.S. PATENT DOCUMENTS

Figure 1A:
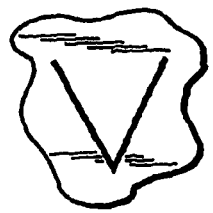

| | | |
|---|---|---|
| 6,068,898 A | 5/2000 | Oyama |
| 6,143,818 A | 11/2000 | Wang et al. |
| 6,441,340 B1 | 8/2002 | Varriano-Marston |
| 6,682,792 B2 | 1/2004 | Schmal et al. |
| 6,787,630 B1 | 9/2004 | Dominquez De Walter et al. |
| 2002/0187694 A1 | 12/2002 | Brighton et al. |
| 2004/0033382 A1 | 2/2004 | Kendig |
| 2004/0213956 A1 | 10/2004 | Stroud, Jr. et al. |
| 2006/0165958 A1 | 7/2006 | Sankey |

FOREIGN PATENT DOCUMENTS

| | | |
|---|---|---|
| EP | 0178218 | 4/1986 |
| EP | 0358461 | 3/1990 |
| EP | 0563442 | 10/1993 |
| EP | 1086809 | 3/2001 |
| EP | 1086809 A | 3/2001 |
| GB | 838708 | 6/1960 |
| GB | 1472004 | 4/1977 |
| GB | 2024715 | 1/1980 |
| GB | 2 046 060 A | 11/1980 |
| GB | 2250408 | 6/1992 |
| GB | 2280342 | 1/1995 |
| GB | 2355956 | 5/2001 |
| JP | 54117582 | 9/1979 |
| JP | 61-48166 | 3/1986 |
| JP | 04-041873 | 4/1992 |
| JP | 06-091808 | 4/1994 |
| JP | 6165636 | 6/1994 |
| JP | 6219465 | 8/1994 |
| JP | 7041043 | 2/1995 |
| JP | 10-147381 | 6/1998 |
| JP | 10-166535 | 6/1998 |
| JP | 11-59747 A | 3/1999 |
| JP | 11-079260 | 3/1999 |
| WO | WO 00/21854 | 4/2000 |
| WO | WO0192000 A | 12/2001 |
| WO | WO 02/26493 | 4/2002 |
| WO | WO 02/059186 | 8/2002 |
| WO | WO 03/026892 | 4/2003 |
| WO | WO 03/061957 | 7/2003 |
| WO | WO 2005/007400 | 1/2005 |
| WO | WO 2005/007531 | 1/2005 |

OTHER PUBLICATIONS

Japanese Office Action; 4 pp.; no abstract available.

* cited by examiner

SELF-VENTING POLYMERIC FILM

This is a U.S. National Phase of PCT/GB2004/003098 filed Jul. 16, 2004.

This invention relates to a composite polymeric film, and a process for the production thereof. The film is suitable for use as packaging for ready-prepared ovenable meals, particularly microwaveable meals, including use as a lid for a container for the ovenable meal. This invention particularly relates to a self-venting composite polymeric film Plastic containers are commonplace in packaging applications, such as food packaging, and in particular for packaging convenience foods, for example ready-prepared ovenable meals which are warmed either in a microwave oven or in a conventional oven. Often the container comprises a polymeric material onto which has been deposited a thin metal layer, such as metallised (particularly flash-metallised) PET carton board. For example, the container may be produced from PET which has been metallised to an optical density in the range of about 0.01 to 4.0 and which is laminated to carton board. Such containers have been referred to as "susceptor" containers and are disclosed in, for instance, GB-A-2280342, EP-A-0563442, GB-A-2250408 and GB-A-2046060.

Ovenable containers for ready prepared meals require lids which can both seal the container, in order to prevent leakage and drying out of the packaged contents and to provide a protective seal against insects, bacteria and air-borne contaminants during storage, and which can also be easily peeled from the container on opening. Other important requirements of the lids are that they should not stick to the packaged contents and that they should be able to withstand the heat generated in the oven. Container lids normally comprise a film comprising a flexible substrate and a heat-sealable layer, and are often referred to as "lidding" films. Oriented polymeric film, particularly biaxially oriented polyester film, has previously been used as the flexible substrate for lidding films. The manufacture of sealed containers using lidding films involves the formation of a seal between the lidding film and the container. This seal is formed by placing the lid on top of the container and applying heat and pressure in order to soften or melt the sealable coating layer so that it adheres to the surface of the container and forms an effective seal between the lid and the container. WO-01/92000-A discloses an air-permeable composite film comprising a perforated substrate layer and a sealing layer in which the material of the sealing layer fills the gaps in the substrate layer, wherein in use the differential pressure between the two sides of the composite film causes reversible enlargement of the gaps, which act as valves, allowing air-permeability in a composite film which would otherwise be impermeable. GB-2355956-A discloses a composite film comprising a gas-permeable polyolefin barrier and a sealable layer, which may be perforated or in the form of a mesh or net, and which is stated as suitable for packaging fresh-cut fruit vegetables. Other optionally heat-sealable composite films comprising a perforated layer are disclosed in EP-0358461-A; EP-0178218-A; US-2002/0187694-A; JP-A-06/219465-A; JP-06/165636-A; JP-54/117582-A.

An important consideration with ready-prepared convenience meals is that water vapour is driven from the food during the cooking cycle. If the steam thereby produced is not properly vented, the build-up of pressure may cause the packaging, for instance the film lid, to burst, causing fragments of the packaging to contaminate the contents of the container. The film lid may also fail locally along the edge of the tray, leading to uneven cooking of the food inside the tray. More importantly, potential hazard is present when handling the tray after the cooking cycle, as steam is likely to escape along the edge of the tray. Previous packaging for ovenable ready-prepared food containers generally required that the user pierce the packaging to prevent this. However, the need for piercing prior to warming the food in its container is often forgotten or not understood by the user. Previous self-venting films which address these problems include those disclosed in WO-02/26493-A; WO-03/026892-A; and WO-03/061957-A. It would be desirable to provide packaging which did not require the user to pierce it before cooking; which provides a barrier to insects, bacteria and air-borne contaminants; and which allows water vapour to freely pass out of the packaging during the cooking cycle.

It is therefore an object of this invention to provide a film suitable for use in packaging ready-prepared ovenable meals, which exhibits self-venting.

According to the present invention, there is provided a heat-sealable, composite film said film comprising a polymeric substrate layer having a first and second surface and disposed on a surface of the substrate layer a water-soluble barrier layer, wherein (i) the substrate layer has one or more venting means therein; and (ii) the thickness of the barrier layer is from about 0.05 to about 40 μm.

The substrate has a first and a second surface. The first surface is the surface which is outermost when the film is used as self-venting packaging as described herein, and the second surface is the surface which is innermost and faces the goods to be packaged. For instance, where the film described herein is used as a lidding film and disposed on a receptacle for ovenable meals, the second surface is the surface which is innermost and faces the container.

In a first embodiment, the substrate layer is itself a heat-sealable layer. In this embodiment, the barrier layer is normally disposed on the first surface of the substrate.

In a second embodiment, the composite film comprises a discrete heat-sealable layer disposed on the second surface of the substrate. In this embodiment, the heat-sealable layer also contains venting means such that the locations of the venting means of the heat-sealable layer correspond to those of the substrate layer and, in practice, the venting means in the heat-sealable and substrate layers are produced at the same time. In this embodiment, the barrier layer is normally disposed on the first surface of the substrate.

The substrate is a self-supporting film or sheet by which is meant a film or sheet capable of independent existence in the absence of a supporting base. The substrate may be formed from any suitable film-forming material. Thermoplastic polymeric materials are preferred. Such materials include a homopolymer or copolymer of a 1-olefin, such as ethylene, propylene and but-1-ene, a polyamide, a polycarbonate, PVC, PVA, polyacrylates, celluloses and a polyester. Polyolefins and polyesters, particularly linear polyesters, are preferred. If the composite film does not comprise an additional heat-sealable layer, the substrate is itself heat-sealable. The substrate is preferably uniaxially or biaxially oriented, preferably biaxially oriented.

Thermoset resin polymeric materials suitable for use as the substrate include addition-polymerisation resins, such as acrylics, vinyls, bis-maleimides and unsaturated polyesters; formaldehyde condensate resins, such as condensates with urea, melamine or phenols, cyanate resins, functionalised polyesters, polyamides or polyimides.

Suitable polyesters include those derived from one or more dicarboxylic acids, such as erephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid), and from one or more glycols, particularly an aliphatic or cycloaliphatic glycol, such as ethylene glycol, 1,3-propanediol, 1,4-butanediol, neopentyl glycol and 1,4-cyclohexanedimethanol. An aliphatic glycol is preferred.

A preferred substrate polyester is selected from polyethylene terephthaate and polyethylene naphthalate. Polyethylene terephthalate (PET) or a copolyester thereof is particularly preferred.

A preferred polyolefin substrate comprises polyethylene or polypropylene, preferably polypropylene.

In the embodiment wherein the substrate is itself heat-sealable, hereinafter referred to as Embodiment A, the substrate comprises a heat-sealable polyolefin (preferably a polypropylene) or a heat-sealable polyester.

In the embodiment wherein the composite film comprises an additional heat-sealable layer, hereinafter referred to as Embodiment B, the substrate preferably comprises a polyester. In Embodiment B, the additional heat-sealable layer is any layer capable of forming a heat-seal bond to the surfaces of the container, for example a polymeric material such as a polyester, ethylene vinyl alcohol (EVA) or a modified polyethylene. The polymer material of the heat-sealable layer should soften to a sufficient extent that its viscosity becomes low enough to allow adequate wetting for it to adhere to the surface to which it is being bonded. In one embodiment, the heat-sealing layer comprises a polyester, particularly a copolyester derived from one or more of the dicarboxylic acid(s) or their lower alkyl diesters with one or more of the glycol(s) referred to herein.

In one embodiment, hereinafter referred to as Embodiment B1, the additional heat-sealable layer comprises a copolyester derived from an aliphatic glycol and at least two dicarboxylic acids, particularly aromatic dicarboxylic acids, preferably terephthalic acid and isophthalic acid. A preferred copolyester is derived from ethylene glycol, terephthalic acid and isophthalic acid. The preferred molar ratios of the terephthalic acid component to the isophthalic acid component are in the range of from 50:50 to 90:10, preferably in the range from 65:35 to 85:15. In a preferred embodiment, this copolyester is a copolyester of ethylene glycol with about 82 mole % terephthalate and about 0 18 mole % isophthalate.

In an alternative embodiment, hereinafter referred to as Embodiment B2, the additional heat-sealable layer comprises a copolyester derived from an aliphatic diol and a cycloaliphatic diol with one or more, preferably one, dicarboxylic acid(s), preferably an aromatic dicarboxylic acid. Examples include copolyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65. In a preferred embodiment this copolyester is a copolyester of terephthalic acid with about 33 mole % 1,4-cyclohexane dimethanol and about 67 mole % ethylene glycol. An example of such a polymer is PETG™6763 (Eastman) which comprises a copolyester of terephthalic acid, about 33% 1,4-cyclohexane diethanol and about 67% ethylene glycol and which is always amorphous. In an alternative embodiment of the invention, the polymer of layer B may comprise butane diol in place of ethylene glycol.

In a further alternative embodiment, hereinafter referred to as Embodiment B3, the additional heat-sealable layer comprises an aromatic dicarboxylic acid and an aliphatic dicarboxylic acid. A preferred aromatic dicarboxylic acid is terephthalic acid. Preferred aliphatic dicarboxylic acids are selected from sebacic acid, adipic acid and azelaic acid. The concentration of the aromatic dicarboxylic acid present in the copolyester is preferably in the range from 45 to 80, more preferably 50 to 70, and particularly 55 to 65 mole % based on the dicarboxylic acid components of the copolyester. The concentration of the aliphatic dicarboxylic acid present in the copolyester is preferably in the range from 20 to 55, more preferably 30 to 50, and particularly 35 to 45 mole % based on the dicarboxylic acid components of the copolyester. Particularly preferred examples of such copolyesters are (i) copolyesters of azeleic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol. Preferred polymers include a copolyester of sebacic acid/terephthalic acid/butylene glycol (preferably having the components in the relative molar ratios of 45-55/55-45/100, more preferably 50/50/100) having a glass transition point ($T_g$) of $-40°$ C. and a melting point ($T_m$) of 117° C.), and a copolyester of azeleic acid/terephthalic acid/ethylene glycol (preferably having the components in the relative molar ratios of 40-50/60-50/100, more preferably 45/55/100) having a $T_g$ of $-15°$ C. and a $T_m$ of 150° C.

In a further alternative embodiment, hereinafter referred to as Embodiment B4, the additional heat-sealable layer comprises an ethylene vinyl acetate (EVA). Suitable EVA polymers may be obtained from DuPont as Elvax™ resins. Typically, these resins have a vinyl acetate content in the range of 9% to 40%, and typically 15% to 30%.

The thickness of an additional heat-sealable layer is generally between about 1 and 30% of the thickness of the substrate. Typically, an additional heat-sealable layer may have a thickness of up to about 25 µm, more preferably up to about 15 µm, more preferably up to about 10 µm, more preferably between about 0.5 and 6 µm, and more preferably between about 0.5 and 4 µm.

Preferably, the composite film exhibits a heat-seal strength (at ambient temperatures) to itself of at least 300 g/25 mm, preferably from about 400 g/25 mm to about 1000 g/25 mm, and more preferably from about 500 to about 850 g/25 mm.

The composite film typically exhibits a heat-seal strength (at ambient temperatures) to a standard APET/CPET tray in the range of 300 to 1800 g/25 mm, and preferably at least 400, preferably at least 600, preferably at least 700 and more preferably at least 800 g/25 mm. Preferably, the heat-seal strength of the coated film to APET/CPET trays is in the range of 800-1500 g/25 mm, preferably 800-1200 g/25 mm.

Formation of the substrate may be effected by conventional techniques well-known in the art. Conveniently, formation of the substrate is effected by extrusion, in accordance with the procedure described below. In general terms the process comprises the steps of extruding a layer of molten polymer, quenching the extrudate and orienting the quenched extrudate in at least one direction.

The substrate may be uniaxially oriented, but is preferably biaxially oriented by drawing in two mutually perpendicular directions in the plane of the film to achieve a satisfactory combination of mechanical and physical properties. Orientation may be effected by any process known in the art for producing an oriented film, for example a tubular or flat film process.

In the preferred flat film process, the substrate-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Alternatively, the cast film may be stretched simultaneously in both the forward and traverse directions in a biaxial stenter. Stretching is effected to an extent determined by the nature of the polyester, for example polyethylene terephthalate is usually stretched so that the dimension of the oriented film is from 2 to 5, more preferably 2.5 to 4.5 times its original dimension in the or each direction of stretching. Typically, stretching is effected at temperatures in the range of 70 to 125° C. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polyester but below the melting temperature thereof, to induce crystallisation of the polyester. In applications where film shrinkage is not of significant concern, the film may be heat set at relatively low temperatures or not at all. On the other hand, as the temperature at which the film is heat set is increased, the tear resistance of the film may change. Thus, the actual heat set temperature and time will vary depending on the composition of the film but should not be selected so as to substantially degrade the tear resistant properties of the film. Within these constraints, a heat set temperature of about 135° to 250° C. is generally desirable, as described in GB-A-838708.

Formation of an additional heat-sealable layer may be effected by conventional techniques. The method of formation of the heat-sealable layer and application thereof to the substrate will depend on the identity of the heat-sealable layer. Conventional techniques include casting the heat-sealable layer onto a preformed substrate layer. Conveniently, formation of an additional heat-sealable layer and the substrate is effected by coextrusion, which would be suitable for Embodiments B1 and B2 above. Other methods of forming the heat-sealable layer include coating the heat-sealable polymer onto the substrate, and this technique would be suitable for Embodiments B3 and B4 above. Coating may be effected using any suitable coating technique, including gravure roll coating, reverse roll coating, dip coating, bead coating, extrusion-coating, melt-coating or electrostatic spray coating. Coating may be conducted "off-line", i.e. after any stretching and subsequent heat-setting employed during manufacture of the substrate, or "in-line", i.e. wherein the coating step takes place before, during or between any stretching operation(s) employed. Preferably, coating is performed in-line, and preferably between the forward and sideways stretches of a biaxial stretching operation ("inter-draw" coating). Examples of the coating of heat-sealable layers include: GB-2024715 and GB-1077813 which disclose the inter-draw extrusion-coating of polyolefin onto substrates of polyolefin and polyester respectively; U.S. Pat. No. 4,333,968 which discloses the inter-draw extrusion-coating of an ethylene-vinyl acetate copolymer onto a polypropylene substrate; and WO-02/59186 which discloses the coating of copolyester, and the disclosures of these documents are incorporated herein by reference.

Prior to application of an additional heat-sealable layer onto the substrate, the exposed surface of the substrate may, if desired, be subjected to a chemical or physical surface-modifying treatment to improve the bond between that surface and the subsequently applied layer. For example, the exposed surface of the substrate may be subjected to a high voltage electrical stress accompanied by corona discharge. Alternatively, the substrate may be pretreated with an agent known in the art to have a solvent or swelling action on the substrate, such as a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The substrate is suitably of a thickness between about 5 and 350 μm, preferably from 9 to about 150 μn and particularly from about 12 to about 400 μm.

The venting means in the substrate layer take the form of one or more incisions or perforations. The incisions or perforations in the substrate layer extend through the thickness of the film, i.e. if the film defines a plane in the x and y dimensions, then the incisions or perforations extend from the first surface of the film through to the second surface of the film substantially along the z-axis. The dimensions and number of the incisions or perforations per unit area may be adjusted depending on the kind of food to be packaged.

Generally, however, the length of the incisions may range from about 1 to about 50 mm. Preferably, there are from about 1 to about 100 incisions per 200 $cm^2$, more preferably from about 1 to about 50 incisions per 200 $cm^2$.

A single straight-line incision is capable of providing self-venting in use. In an alternative embodiment, a plurality of incisions can be disposed together, referred to herein as a "set" of incisions, such that the set of incisions creates one or more flaps in the film, which are capable of movement in response to the pressure build-up within the sealed container during the cooking cycle.

Incision of the substrate and, if present, the additional heat-sealable layer may be effected using any suitable cutting method, including blades and lasers.

Where the self-venting means comprises perforations, the average diameter is preferably from about 0.05 to about 1.5 mm, preferably from about 0.05 to about 1.0 mm, more preferably from about 0.05 to about 0.7. In one embodiment (Embodiment I; laser perforation), the perforations are in the range of 0.05 to 0.3 mm, and typically in the range of 0.05 to 0.1 mm. In a further embodiment (Embodiment II; hot needle or gas flame perforation), the perforations are in the range of 0.1 to 1.5 mm, preferably in the range of about 0.1 to 1.0 mm. Preferably (for Embodiment 1), there are from about 10 to 100,000 perforations per 200 $cm^2$ (i.e. over an area measuring 20 cm×10 cm), and more preferably from about 100 to about 10,000 perforations per 200 $cm^2$. Preferably (for Embodiment 2), there are from about 1 to about 100,000 perforations per 200 $cm^2$, more preferably from about 10 to about 10,000 perforations per 200 $cm^2$.

A perforated substrate preferably has a degree of perforation of from about 0.001 to about 50%, preferably from about 0.01 to about 10%. In one embodiment, the degree of perforation is from about 0.01 to about 50%, typically from about 1 to 50%, more typically from about 1 to 30%, and more typically from about 1 to 10%. The term "degree of perforation" as used herein refers to the hole fraction of the total surface area expressed as a percentage, i.e. it is the total area of the perforations as a percentage of the total film surface area.

Perforations in the substrate and, if present, the additional heat-sealable layer may be effected using any suitable means. A laser beam (for example a $CO_2$ laser) is suitable for perforations in the range of 0.05 and 0.3 mm. Mechanical perforation of the substrate and, if present, the additional heat-sealable layer may be effected by a hot needle technique (for example using an Intermittent Hot Needle Perforator PX9 series; BPM Engineering Services Ltd, Rochdale, UK), and this technique is generally suitable for perforations having a hole diameter in the range of 0.1 to 1.5 mm, and typically 0.1 to 0.7 mm. Mechanical perforation of the substrate and, if present, the additional heat-sealable layer may also be effected by a gas flame techniques (for example using a Sherman gas flame film perforator), and this technique is generally suitable for perforations having hole size from 0.4 mm upwards.

Preferably all incisions or sets of incisions or perforations in the substrate have the same or substantially the same dimensions. The incisions or perforations are preferably present throughout the entire substrate. In an alternative embodiment, for instance where the film is used as a lidding film on a receptacle, there may be different compartments in the receptacle, and so the incisions or perforations may be present in only certain parts of the substrate, or in different dimensions or densities at different parts of the substrate.

The incisions (or sets of incisions) or perforations are preferably disposed in a regular formation, and typically in one or more lines across the substrate. Any suitable pattern may be adopted. For instance, perforations may be arranged in a cubic close-packed arrangement or a hexagonal close-packed arrangement.

In the use of the film described herein as a lidding film, the function of the barrier layer is to provide a physical barrier to entry of external contaminants into the container, such as insects, bacteria and air-borne contaminants, which would spoil the food substance contained therein during transport and storage. The barrier layer is also adapted to allow egress of water vapour generated during the cooking cycle of the food substance, ie. to allow the lidded container to be self-venting.

As described above, the barrier layer is normally disposed on the first surface of the substrate, such as in Embodiments A and B above, and forms the outermost layer of the packaging when disposed on a receptacle for ovenable meals.

Preferably, the barrier layer extends over the whole surface of the substrate. In one embodiment, however, the barrier layer does not extend across the whole surface of the substrate, for instance in cases where the substrate comprise incisions or perforations only in one or more discrete regions. In that embodiment, the barrier layer need only be applied onto the substrate in those discrete regions. Thus, the barrier layer may be coated as one or more strips across the width or length of the film in regions which cover the line(s) of perforations.

The barrier layer forms a discrete layer on at least part of the surface of the substrate and is disposed over the venting means, i.e. the barrier layer does not substantially extend into or fill the venting means. As used herein, the term "substantially extend into or fill the venting means" means that the material of the barrier layer occupies no more than 50%, preferably no more than 40%, preferably no more than 30%, preferably no more than 20%, preferably no more than 10%, preferably no more than 5%, and preferably 0% of the volume of a venting means, the volume of a venting means being defined as the volume of a void formed in the substrate layer by a venting means.

The barrier layer may be formed from a variety of film-forming materials, provided that the formed film is completely or partially soluble in water. The water vapour which is generated during the cooking cycle partially or completely dissolves the polymeric layer in the regions of the incisions or perforations. Water vapour generated during the cooking cycle may then escape through the film via the incisions or perforations in the substrate layer, thereby allowing self-venting of the container.

Solubility is measured as the fraction of the barrier layer dissolved when the film is immersed in deionised water at 80° C. for 2 minutes. Thus, in the case of a completely water soluble barrier layer, the mass fraction of layer dissolved is 1. It is preferred that the mass fraction of layer dissolved is at least 0.5, preferably at least 0.65, preferably at least 0.8, preferably at least 0.9, preferably at least 0.95, preferably at least 0.99, and preferably 1.

Thus, the material of the barrier layer is partially or completely soluble in water at 80° C. for 2 minutes. Accordingly, when exposed to water vapour at elevated temperatures the portion(s) of the barrier layer over the one or more venting means partially or completely dissolves. The portion(s) of the barrier layer over the one or more venting means is thus irreversibly removed such that the barrier properties thereof (for instance to bacteria, air-borne contaminants and insects) are destroyed by exposure to water vapour, for instance upon completion of the cooking cycle. Reference herein to "elevated temperatures" is particularly a reference to the temperatures typically achieved by water vapour produced by the cooking cycle of an ovenable meal, that is to say at least 60° C., preferably at least 70° C., preferably at least 80° C., preferably at least 90° C., and preferably at least 100° C.

Suitable polymers for formation of a water-soluble barrier layer are polymers which enable the formation of hydrogen bonds between their backbone and water molecules, and polymers which present ionic groups on their backbone. Suitable polymers include polysaccharides (including chitin, chitosan, guar, water-soluble cellulose derivatives (including ester and ether derivatives, such as cellulose acetate, cellulose acetate-butyrate, cellulose acetate-propionate, ethyl cellulose, hydroxypropyl cellulose, hydroxyethyl cellulose, methyl hydroxypropyl cellulose etc)), water-soluble starch and starch derivatives, polyvinyl alcohol, vinyl acetate-vinyl alcohol-polyoxyalkyelene methacrylate copolymers (Vinex), xanthan gum, polyvinylpyrrolidone and polypeptides (including gelatin). A plasticiser may be used when forming films from such materials, and suitable plasticizers include glycerol and polyethyleneglycol, etc in water. Surfactants may be employed when coating a polymer from a solution onto the substrate layer to enhance wetting. Suitable cross linkers may also be used to vary the water solubility of the barrier layer, from complete to partial solubility in water.

The thickness of a barrier layer is from about 0.05 to about 40 µm, preferably from about 1.0 to about 40 µm, preferably from about 5 to about 40 µm, preferably from about 5 to about 30 µm, preferably from about 10 µm to about 25 µm. In one embodiment, the barrier layer is no more than about 12 µm, and in a further embodiment no more than about 8 µm.

The composite film comprising the substrate and barrier layers may be formed by any suitable technique, for instance by coating from a solution, lamination of the barrier layer onto the substrate (or onto the substrate and heat-sealable layer composite), or extrusion coating from a polymer melt The method of manufacture will depend on the identity of the barrier and substrate layers and/or on the structure of the substrate layers. Where the substrate comprises perforations of less than 0.1 mm, the barrier layer may be applied either by lamination or coating techniques. Where the substrate comprises perforations of greater than 0.1 mm, the barrier layer is more suitably applied by extrusion coating or lamination. Where the substrate comprises incisions, the method of application of the coating layer may be achieved either by either by solution coating, lamination or extrusion coating. The coating or lamination step may be performed according to conventional techniques well-known in the art.

The coating step may, for example, be conducted using gravure coating (direct or indirect), slot-die coating (when coating a polymer solution), extrusion coating or melt coating techniques (when coating a polymer melt). The viscosity of the coating liquid at the point of application to the substrate must not be too high otherwise the polymer will not flow properly, resulting in difficulties in coating and uneven coat thicknesses, but should not be too low that the coating liquid passes through the incisions or perforations in the substrate layer. Preferably, the viscosity of the coating liquid is at least 0.05 Pa·s.

Slot-die coating and gravure coating are well-known in the art, and are particularly applicable when the viscosity of the coating liquid is from about 0.05 to about 5 Pa·s, with gravure coating being more suitable at the lower end of this range, and slot-die coating being more suitable at the higher end of this range.

Extrusion-coating is described by K. A. Mainstone in Modem Plastics Encyclopedia, 1983-84, Vol. 60, No. 10A, Edition 1, pp195-198 (McGraw-Hill, N.Y.) and also by Franz Durst and Hans-Günte Wagner in Liquid Film Coating (Chapman and Hall; 1997; Eds S. F. Kistler and P. M. Schweizer; Chapter 11a). The extrusion-coating process is generally used for polymers of medium or high viscosity (at least 50 Pa·s and up to about 5000 Pa·s) and generally employs an air-gap (typically about 15 cm) between the die and the substrate. The coated substrate is passed between a heat-removing chill roller and a pressure-loaded resiliently-covered nip-roll. Typically, an extrusion-coating process is performed at a temperature of at least 200° C. and often higher.

Melt-coating, also known as hot melt-coating or slot-coating, is described by Durst and Wagner (ibid). The coating is generally conducted at a temperature of about 260° C. or below (typically 200 to 260° C., particularly 220 to 250° C., and more particularly 230 to 250° C.). Melt-coating equipment typically comprises a melter, coupled to a die via an insulated flexible hose. The melter consists of a hopper having heating elements at its base, which heat the polymer/adhesive to a molten state. The hopper is fed continuously by conventional means so that the melter is always "topped up", thereby minimising air ingress to the molten polymer to reduce oxidation of the molten polymer. The molten polymer is then pumped through the hose to a traditional "coathanger" die. In the traditional melt-coating process, the substrate web is pressed up against the die by a roller such that there is no air gap between the die and substrate. The roller is generally a rubber-backing roller which provides sufficient back-pressure to the die to provide an even coating layer. Preferably the viscosity of the coating layer polymer at the processing temperature is no more than about 50 Pa·s and preferably at least about 20 Pa·s.

A lamination process should be conducted such that the important characteristics of the film are retained. If the adhesive layer is too thick, it may prevent the passage of water vapour through the film. Accordingly, a lamination step should use only a minimum of adhesive, if adhesive is needed.

The composite film of the present invention requires only a low delamination resistance for suitability in its primary intended application, i.e. lidding film for ovenable containers. Typically, the delamination bond strength of the composite film is no more than 300 g/25 mm, preferably from about 100 g/25 mm to about 300 g/25 mm, and more preferably from about 150 to about 300 g/25 mm. Preferably, therefore, the adhesive is applied at a coat weight of no more than 2.0 g/m$^2$, preferably no more than 0.5 g/m$^2$, and preferably no more than 1.0 g/m$^2$. In a preferred embodiment, the adhesive comprises an EVA, and is preferably a fast-setting adhesive, for instance BAM301 (Beardow and Adams Ltd, Milton Keynes, UK), which has a typical setting time of between 1 and 2 seconds. In one embodiment, the adhesive is applied to the barrier film or the substrate (preferably the barrier film) using a conventional spray melt-coating technique. Spray melt-coating equipment (Dynafibre™) is obtainable from Mercers Ltd (Rugby, UK; a licensee of ITW Dynatech Inc, USA). Lamination is then conveniently effected by passing the barrier film and the substrate through a heated nip-roller to obtain the final composite film. Other methods and equipment suitable for effecting lamination will be apparent to the skilled person.

Prior to lamination or coating, the exposed surface of the substrate and/or barrier layers of the composite film may, if desired, be subjected to a chemical or physical surface-modifying treatment as described hereinabove. In particular, a surfactant is preferred when coating from a solution the barrier layer onto the substrate in order to decrease the surface tension of the substrate layer and allow the wetting of the surface by the coating solution, and thereby obtain a uniform layer.

Where the barrier layer is a self-supporting film, it may itself be uniaxially or biaxially oriented, as described herein. It will be understood that where a lamination technique is used to make the composite film, a self-supporting film may be manufactured by the film production methods described generally herein.

According to a further aspect of the present invention, there is provided a process for producing a heat-sealable composite film comprising
  (a) providing a polymeric substrate layer having a first and second surface and optionally a discrete heat-sealable layer disposed on the second surface of the substrate;
  (b) providing one or more venting means in said substrate and if present said discrete heat-sealable layer; and
  (c) providing a water-soluble barrier layer on a surface of the substrate,
wherein the thickness of the barrier layer is from about 0.05 to about 40 μm.

One or more of the layers of the polymeric film may conveniently contain any of the additives conventionally employed in the manufacture of polymeric films. Thus, agents such as cross-linking agents, dyes, pigments, voiding agents, lubricants, anti-oxidants, radical scavengers, UV absorbers, thermal stabilisers, anti-blocking agents, surface active agents, slip aids, optical brighteners, gloss improvers, prodegradents, viscosity modifiers and dispersion stabilisers may be incorporated as appropriate. In particular the composite film may comprise a particulate filler which may, for example, be a particulate inorganic filler or an incompatible resin filler or a mixture of two or more such fillers. Such fillers are well-known in the art.

Particulate inorganic fillers include conventional inorganic fillers, and particularly metal or metalloid oxides, such as alumina, silica (especially precipitated or diatomaceous silica and silica gels) and titania, calcined china clay and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the polymer layer. Preferred particulate inorganic fillers include titanium dioxide and silica.

The inorganic filler should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 µm, more preferably 0.05 to 1.5 µm, and particularly 0.15 to 1.2 µm. Preferably at least 90%, more preferably at least 95% by volume of the inorganic filler particles are within the range of the volume distributed median particle diameter±0.8 µm, and particularly±0.5 µm. Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile.

The components of the composition of a layer may be mixed together in a conventional manner. For example, by mixing with the monomeric reactants from which the layer polymer is derived, or the components may be mixed with the polymer by tumble or dry blending or by compounding in an extruder, followed by cooling and, usually, comminution into granules or chips. Masterbatching technology may also be employed.

In the preferred embodiment, the film of the present invention is optically clear, preferably having a % of scattered visible light (haze) of <10%, preferably <6%, more preferably <3.5% and particularly <2%, measured according to the standard ASTM D 1003. Preferably, the total light transmission (TLT) in the range of 400-800 nm is at least 75%, preferably at least 80%, and more preferably at least 85%, measured according to the standard ASTM D 1003. In this embodiment, filler is typically present in only small amounts, generally not exceeding 0.5% and preferably less than 0.2% by weight of the polymer of a given layer.

The primary use of the polymeric film of the invention is for sealing or providing a lid on a receptacle for packaging convenience or ready-prepared foods, for example ovenable meals which are warmed either in a microwave or a conventional oven. The film allows the steam produced during the cooking cycle to be vented from the container. The self-venting films of the present invention are also advantageous in that they promote uniform heating over the whole volume of the foodstuff, which can be a problem with existing lids for these types of applications. The receptacle may be a tray such as a thermoformed tray or bowl, and may for instance be formed of polyester, such as polyethylene terephthalate, or of polypropylene, polystyrene, or may be PVDC-coated. Typically, however, the receptacle for an ovenable meal is an APET/CPET tray (a composite material having an amorphous polyethylene terephthalate layer on top of a crystalline polyethylene terephthalate layer). Other suitable types of receptacle include a foil tray (particularly an aluminium foil tray), a metallised tray and a tray formed from PET-coated carton board or paperboard. Of particular utility are trays formed from metallised (particularly flash-metallised) PET carton board. For example, the tray may be produced from PET which has been metallised to an optical density in the range of about 0.01 to 4.0 and which is laminated to carton board. In one embodiment, the tray is a susceptor tray made from materials such as those disclosed in GB-A-2280342, EP-A-0563442 or GB-A-2250408, or is a susceptor tray produced in accordance with the disclosures of these documents, which are incorporated herein by reference.

In an alternative embodiment, the film is heat-sealed to itself to form substantially all of the packaging in an ovenable ready-prepared meal. In this embodiment, the seal is provided by heat-sealing a first portion of the film to a second portion of the film. Such seals are effected by conventional techniques and include "fin seals" and "overlap seals", preferably fin seals. Once the food product is placed within the film, the two portions of the film which are to be bonded together are brought together with the heat sealable surface of one film portion being in contact with the heat sealable surface of the other film portion, and the heat-seal bond formed by the application of temperature and optionally pressure using conventional equipment. The heat-seal bond may be formed at temperatures in the range of about 110 to about 150° C.

The invention further provides a packaged food product, particularly an ovenable meal, wherein the packaging comprises a film as defined herein.

The invention further provides a sealed container comprising a receptacle containing a food product, particularly an ovenable meal, and a lid formed from a polymeric film as defined herein. The sealed container is produced by techniques well-known to those skilled in the art. Once the food to be packaged has been introduced into the receptacle, the heat-sealable film lid is affixed using temperature and/or pressure using conventional techniques and equipment.

The invention further provides a packaged, sealed food product wherein the packaging which effects and forms the seal around the food product is a composite film as defined herein which is heat-sealed to itself.

In a further aspect, the present invention provides the use of a film as described herein as packaging for an ovenable meal.

In a further aspect, the present invention provides the use of a film as described herein as a lid in the packaging of an ovenable meal, said packaging further comprising a receptacle.

In a further aspect, the present invention provides the use of a film as described herein as a self-venting film in the packaging of an ovenable meal, particularly wherein said packaging comprises the film as a lidding film and further comprises a receptacle.

The following test methods may be used to characterise the polymeric film:
(i) Clarity of the film may be evaluated by measuring total light transmission (TLT) and haze (% of scattered transmitted visible light) through the total thickness of the film using a Gardner XL 211 hazemeter in accordance with ASTM D-1003-61.
(ii) Heat-seal strength of the heat-sealable layer to itself is measured by positioning together and heating the heat-sealable layers of two samples of polyester film at 140° C. for one second under a pressure of 275 kPa (40 psi). The sealed film is cooled to room temperature, and the sealed composite cut into 25 mm wide strips. The heat-seal strength is determined by measuring the force required under linear tension per unit width of seal to peel the layers of the film apart at a constant speed of 4.23 mm/second.

(iii) Heat-seal strength to a standard APET/CPET tray is measured by the following procedure. The coated film was sealed, by means of the coating layer, to a standard APET/CPET tray using a Microseal PA 201 (Packaging Automation Ltd, England) tray sealer at a temperature of 180° C., and pressure of 80 psi for one second. Strips (25 mm) of the sealed film and tray were cut out at 90° to the seal, and the load required to pull the seal apart was measured using an Instron Model 4301 operating at a crosshead speed of 0.2 min$^{-1}$. The procedure was repeated and a mean value of 5 results calculated.

(iv) Delamination Bond Strength is measured by the following procedure. Using a straight edge and a calibrated sample cutter (25 mm±0.5 mm) five strips of laminate of minimum length 100 mm are cut. Peel between the laminated layers is initiated at one end of each sample and the laminates peeled apart over a distance of approximately 40 mm in length Each sample in turn is tested using an Instron model 4464 materials test machine, using pneumatic action grips with rubber jaw faces. Crosshead speed was 50 mm/min$^{-1}$. The samples are inserted into the Instron jaws with one layer clamped in the fixed jaws and the other half in the moving jaws ensuring that an equal amount of each layer is held in each jaw to allow the laminate to be pulled apart evenly. The equipment records the mean peel strength of each sample between 10 mm and 50 mm and the bond strength of the laminate is quoted as an average of 5 samples in g\25 mm.

(v) Oxygen Transmission Rates may be determined using conventional techniques in a Mocon 1050 (Modem Controls Inc.) test instrument. A sample of the film is placed in the machine with the nitrogen carrier gas (containing 1% hydrogen) flowing both above and below the sheet, in order that a background reading can be obtained. The nitrogen above the sheet is replaced by oxygen, and the amount of oxygen able to permeate through the sheet is measured in a carrier gas by using a sensor.

(vi) Solubility of the barrier layer is measured as the fraction of layer dissolved when the film is immersed in deionised water at 80° C. for 2 minutes. Thus, in the case of a completely water soluble barrier layer, the fraction of layer dissolved is 1. The procedure is as follows. A film sample (200 cm$^2$) is weighed and then immersed in 1-liter of deionised water at 80° C. for 2 minutes, with stirring. The film sample is then dried at 120° C. for 10 minutes in an oven. The weight of the treated film sample is then measured. The weight of the water soluble layer fraction can then be calculated, since the weight of the coated film prior to dissolution is known. In the case of a completely soluble barrier layer, the weight of the sample after dissolution will be equal to the weight of the uncoated film (i.e. the substrate layer). The film may also be inspected using a microscope (Microviewer Nikon V12B—magnification 50) to assess the covering of the slits/holes. In the case of a completely soluble barrier layer, inspection of the film shows that the barrier layer has disappeared, leaving the slits or perforations uncovered. In the case of a partially soluble barrier layer, the dissolved fraction will be between 0 and 1, though much closer to 1, and the perforations or slits remain at least partially covered.

(vii) Self-venting is measured as the time (in seconds) required for the film to fail on at least on side of a tray. This time can be referred to as the bursting time. The film is heat-sealed at 150° C. for 1 second under 5.5 bar, to a polypropylene tray (area: 16.5 cm×12.5 cm, depth: 3.5 cm) containing 50 cm$^3$ of deionised water. The sealed tray is then put in a microwave oven at power 900 W, set up for 10 minutes. A film with a 1 cm diameter hole does not fail for 10 minutes, while a film heat-sealed to a PP tray without any incisions or perforations blows after 40-50 seconds.

Figure 1B:
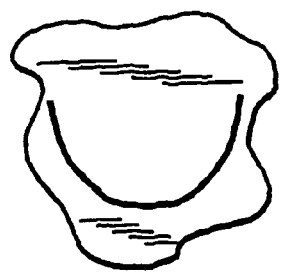
Figure 1C:
Figure 1D:
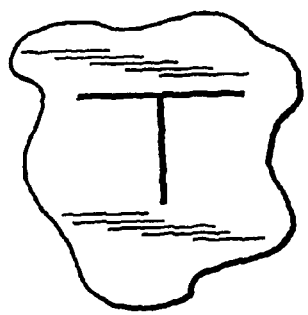
Figure 1E:
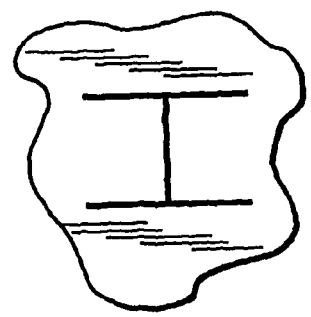
Figure 1F:
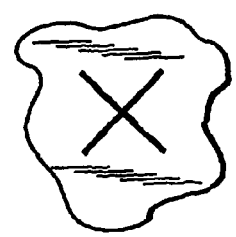
Figure 1G:
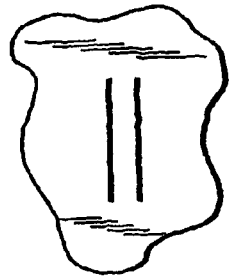
Figure 1H:
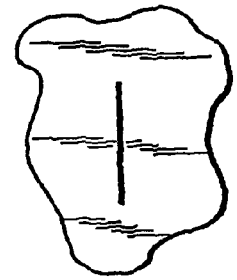

The invention is illustrated by reference to FIG. 1 which shows patterns (a) to (h) for the incisions in the substrate layer.

The invention is further illustrated by the following examples. It will be appreciated that the examples are for illustrative purposes only and are not intended to limit the invention as described above. Modification of detail may be made without departing from the scope of the invention.

EXAMPLES

Example 1

A polymer composition comprising polyethylene terephthalate was melt-extruded, cast onto a cooled rotating drum and stretched in the direction of extrusion to approximately 3 times its original dimensions. The film was passed into a stenter oven at a temperature of 100° C. where the film was stretched in the sideways direction to approximately 3 times its original dimensions. The biaxially stretched film was heat-set at a temperature of about 230° C. by conventional means. A heat-sealable ethylene vinyl acetate polymer (EVA Elvax™ resin; DuPont) coating layer was applied to the substrate by solubilising the EVA in toluene/THF and applying to the substrate off-line by gravure coating. The total thickness of the final film was 23 µm, of which 3 µm was the coating layer. Incisions were then effected in the substrate by straight blades. The incisions were linear and comprised 2 lines (each of about 2 cm long) per 200 cm$^2$.

The substrate was then coated using a peristaltic pump and a slot die with an aqueous solution comprising a polysaccharide, as follows:

(i) 2% weight/weight chitosan (a polysaccharide formed primarily of repeating units of D-glucosamine in which greater than 75% of the units are deacetylated, and with a high molecular weight; Aldrich);
(ii) 2% w/w Acetic acid;
(iii) 0.1% w/w Tween 20 (polyoxyethylene sorbitan monolaureate; Aldrich); and
(iv) 0.5% w/w PEG-400 polyethylene glycol with a molecular weight (number average) of about 400 g.mol$^{-1}$; Aldrich).

The coated substrate is then dried at 150° C. for a few minutes. The coated film is then heat-sealed to a polypropylene (PP) tray at 150° C. under a pressure of 5.5 bar for 1 second using a Sentinel Heat Sealer (Packaging Industries, USA). The self-venting properties of the film were tested as described herein, and the film failed after 70-80 seconds.

Example 2

The procedure of Example 1 was followed except that (i) the incisions comprised 4 lines (each 3-4 cm long) per 200 cm$^3$; and (ii) the coating was a 24% polyvinylalcohol (PVA) solution in water (Celvol 24-203; Celanese; viscosity 250-1300 mPa·s; 88% hydrolysed (88% hydroxyl; 12% OCOCH$_3$)). The coated film failed after 70-80 seconds.

The invention claimed is:

1. A heat-sealable, composite film comprising a biaxially oriented polymeric substrate layer having a first and second surface, and disposed on a surface of the substrate layer a water-soluble barrier layer extending over the entire surface, wherein
   (i) the substrate layer has one or more venting means therein; and
   (ii) the thickness of the barrier layer is from about 0.05 to about 40 μm.

2. The film according to claim 1 wherein the thickness of the barrier layer is from about 5 to about 30 μm.

3. The film according to claim 1 wherein the barrier layer is selected from polysaccharides, polyvinyl alcohol, vinyl alcohol copolymers, polyvinylpyrrolidone and polypeptides.

4. The film according to claim 3 wherein the barrier layer is selected from chitosan, xanthan gum, cellulose derivatives, starch and starch derivatives and vinyl acetate-vinyl alcohol-polyoxyalkylene methacrylate copolymers.

5. The film according to claim 4 wherein the barrier layer is disposed on the first surface of the substrate.

6. The film according to claim 1 wherein the substrate layer is a polyolefin.

7. The film according to claim 1 wherein the substrate comprises polyester.

8. The film according to claim 1 wherein the substrate comprises polyethylene terephthalate.

9. The film according to claim 1 wherein the substrate layer is a heat-sealable layer.

10. The film according to claim 1 wherein there is disposed on the second surface of the substrate layer a heat-sealable layer.

11. The film according to claim 10 wherein the heat-sealable layer is a copolyester derived from ethylene glycol, terephthalic acid and isophthalic acid.

12. The film according to claim 10 wherein the heat-sealable layer is a copolyester derived from terephthalic acid, ethylene glycol and 1,4-cyclohexanedimethanol.

13. The film according to claim 10 wherein the heat-sealable layer is a copolyester derived from an aromatic dicarboxylic acid, an aliphatic dicarboxylic acid and a stoichiometric amount of one or more glycols, wherein the concentration of said aromatic dicarboxylic acid in the copolyester is in the range from 50 to 55 mole % based on all the dicarboxylic acid components of the copolyester, and the concentration of said aliphatic dicarboxylic acid in the copolyester is in the range from 45 to 50 mole % based on all the dicarboxylic acid components of the copolyester.

14. The film according to claim 13 wherein said aromatic dicarboxylic acid is terephthalic acid, wherein said aliphatic dicarboxylic acids are selected from sebacic acid, adipic acid and azelaic acid, and wherein the glycol component is ethylene or butylene glycol.

15. The film according to claim 10 wherein said heat-sealable layer comprises an ethylene vinyl acetate (EVA) having a vinyl acetate content in the range of 9% to 40%.

16. The film according to claim 1 wherein the venting means comprises incisions which are from about 1 to about 40 mm in length.

17. The film according to claim 16 having from 1 to 100 incisions per 200 $cm^2$.

18. The film according to claim 1 wherein the venting means comprises perforations having an average diameter from about 0.05 to about 1.5 mm.

19. The film according to claim 18 wherein the venting means comprises from about 1 to about 100,000 perforations per 200 $cm^2$.

20. The film according to claim 18 or 19 wherein the substrate has a degree of perforation of from about 0.001 to about 50%.

21. A process for producing a heat-sealable composite film comprising
   (a) providing a polymeric substrate layer having a first and second surface and optionally a discrete heat-sealable layer disposed on the second surface of the substrate;
   (b) providing one or more venting means in said substrate and if present said discrete heat-sealable layer; and
   (c) providing a water-soluble barrier layer on a surface of the substrate, wherein the thickness of the barrier layer is from about 0.05 to about 40 μm.

22. A process according to claim 21 wherein the barrier layer is coated onto the substrate.

23. An ovenable meal in a package comprising a film according to claim 1.

24. The ovenable meal according to claim 23 wherein said film allows self-venting of the package of said ovenable meal.

25. The package according to claim 23 further comprising a lid said lid comprising said film, said packaging further comprising a receptacle for the ovenable meal.

26. A packaged food product wherein the packaging comprises a film according to claim 1.

27. A packaged food product according to claim 26 wherein the packaging comprises a receptacle containing the food product, and a lid, said lid comprising said film.

28. The film according to claim 11 wherein the molar ratio of the terephthalic acid component to the isophthalic acid component is in the range from 65:35 to 85:15.

29. The film according to claim 11 wherein the molar ratio of the terephthalic acid component to the isophthalic acid component is about 82:18.

30. The film according to claim 12 wherein the molar ratio of 1,4-cyclohexanedimethanol to ethylene glycol is in the range from 30:70 to 35:65.

31. The film according to claim 12 wherein the molar ratio of 1,4-cyclohexanedimethanol to ethylene glycol is about 33:67.

* * * * *